US008831094B2

(12) United States Patent
Hong

(10) Patent No.: US 8,831,094 B2
(45) Date of Patent: *Sep. 9, 2014

(54) VIDEO PROCESSING METHOD AND APPARATUS BASED ON MULTIPLE TEXTURE IMAGES

(75) Inventor: Sung-Hoon Hong, Daegu (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 423 days.

This patent is subject to a terminal disclaimer.

(21) Appl. No.: 13/222,494

(22) Filed: Aug. 31, 2011

(65) Prior Publication Data

US 2012/0051422 A1   Mar. 1, 2012

(30) Foreign Application Priority Data

Sep. 1, 2010   (KR) ........................ 10-2010-0085610
May 16, 2011   (KR) ........................ 10-2011-0045680

(51) Int. Cl.
*H04B 1/66*   (2006.01)
*H04N 19/537*   (2014.01)
*H04N 19/20*   (2014.01)
*G06K 9/36*   (2006.01)

(52) U.S. Cl.
CPC ........... *H04N 7/365* (2013.01); *H04N 7/26638* (2013.01)
USPC ..................................... 375/240.08; 382/243

(58) Field of Classification Search
CPC ...... H04N 7/26638; H04N 7/365; H04N 7/26
USPC ........ 348/402.1, 403.1, 169, 143, 222.1, 155, 348/500, 571; 382/236, 232, 238, 190, 181, 382/191, 276, 305, 243; 375/240.01–240.29
See application file for complete search history.

(56) References Cited

U.S. PATENT DOCUMENTS

| | | | | |
|---|---|---|---|---|
| 7,949,053 B2* | 5/2011 | Makai et al. | ............. | 375/240.26 |
| 2003/0033347 A1* | 2/2003 | Bolle et al. | ..................... | 709/107 |
| 2004/0071363 A1* | 4/2004 | Kouri et al. | ................... | 382/276 |
| 2005/0226506 A1* | 10/2005 | Aharon et al. | ................ | 382/180 |
| 2007/0133886 A1 | 6/2007 | Berretty et al. | | |
| 2009/0185747 A1* | 7/2009 | Segall et al. | .................. | 382/220 |
| 2012/0177121 A1* | 7/2012 | Tripathi et al. | .......... | 375/240.16 |

FOREIGN PATENT DOCUMENTS

| | | |
|---|---|---|
| JP | 9-70040 | 3/1997 |
| JP | 2007-527155 | 9/2007 |
| JP | 2008-5349 | 1/2008 |
| JP | 2008-532431 | 8/2008 |
| KR | 1996-0028575 | 7/1996 |
| KR | 1997-0057869 | 7/1997 |
| KR | 1998-066492 | 10/1998 |
| KR | 1999-0032072 | 5/1999 |
| KR | 10-2004-0047009 | 6/2004 |
| WO | WO2006/094035 | 9/2006 |

\* cited by examiner

*Primary Examiner* — Behrooz Senfi
(74) *Attorney, Agent, or Firm* — Staas & Halsey LLP

(57) ABSTRACT

Disclosed herein is a video processing apparatus and method based on multiple texture images, which can process videos with optimal video quality at a low transfer rate. For this, an input video is divided into shot segments, and one is selected from a plurality of frames of each shot segment as a seed image. A plurality of texture points are detected from the seed image. The plurality of texture points are tracked from the plurality of frames of the shot segment and then spatio-temporal location transform variables for the respective texture points are calculated. A plurality of texture images are defined using texture points at which the spatio-temporal location transform variables correspond to one another.

12 Claims, 5 Drawing Sheets

VIDEO PROCESSING METHOD AND APPARATUS BASED ON MULTIPLE TEXTURE IMAGES

CROSS REFERENCE TO RELATED APPLICATIONS

This application claims the benefit of Korean Patent Application Nos. 10-2010-0085610 filed on Sep. 1, 2010, and 10-2011-0045680 filed on May 16, 2011, which are hereby incorporated by reference in their entirety into this application.

BACKGROUND OF THE INVENTION

1. Technical Field

The present invention relates generally to a video processing method and apparatus based on multiple texture images. More particularly, the present invention relates to a video processing apparatus and method based on multiple texture images, which can process videos with optimal video quality at a low transfer rate.

2. Description of the Related Art

A typical video processing method is based on a method of performing transform region-based processing on signals, which have been motion-estimated and processed between video frames, using a discrete cosine transform or the like. However, such a typical video processing method is problematic in that it is difficult to represent the characteristics of various actual videos due to the incorrect estimation and modeling of the characteristics of videos. Further, due thereto, a problem arises in that the differences between a transformed video signal and the original video signal increase, thus increasing a bit rate when the relevant video signal is compressed. In order to solve this problem, although video compression standards represented by MPEG 1/2/4 and H.261/263/264 have been proposed, the deterioration of video quality still becomes serious upon video compression at a low transfer rate, such as 1/500 bit rate relative to the original video size, at the present time. Further, a 1/n pixel-based motion estimation and compensation method, an adaptive block size transform region-based video processing method, a multi-reference frame motion estimation and compensation method, and a generalized B-frame processing method have been proposed and used. However, there still remains a disadvantage in that the deterioration of video quality is serious upon video compression at the low transfer rate.

SUMMARY OF THE INVENTION

Accordingly, the present invention has been made keeping in mind the above problems occurring in the prior art, and an object of the present invention is to represent various video characteristics using a plurality of texture images and the spatio-temporal location transform variables of the texture images.

Another object of the present invention is to remarkably reduce the size of a compressed video compared to the size of the original video by compressing and processing the original video only using a plurality of texture images and a plurality of spatio-temporal location transform variables corresponding thereto.

A further object of the present invention is to further reduce the size of a compressed video by approximating a number of predetermined texture images using similarities between spatio-temporal location transform variables.

Yet another object of the present invention is to process videos with optimal video quality at a low transfer rate.

In accordance with an aspect of the present invention to accomplish the above objects, there is provided a video processing method based on multiple texture images, including dividing an input video into shot segments, and selecting one from a plurality of frames of each shot segment as a seed image; detecting a plurality of texture points from the seed image; tracking the plurality of texture points from the plurality of frames of the shot segment and then calculating spatio-temporal location transform variables for the respective texture points; and defining a plurality of texture images using texture points at which the spatio-temporal location transform variables correspond to one another.

Preferably, the video processing method may further include compressing the plurality of texture images and spatio-temporal location transform variables respectively corresponding to the texture images.

Preferably, the compressing may be configured to compress the texture images in a video compression manner, and separately compress the spatio-temporal location transform variables in a bit stream compression manner.

Preferably, the video processing method may further include merging texture images, which have spatio-temporal location transform variables for which similarities calculated by obtaining correlation characteristics between texture image signals have values falling within a preset threshold value, among the plurality of texture images, into a single texture image, thus approximating the texture images.

Preferably, the detecting the plurality of texture points may be configured to detect, as the texture points, points having variations equal to or greater than a preset value in the plurality of frames.

Preferably, the video processing method may further include decompressing the plurality of compressed texture images and the plurality of compressed spatio-temporal location transform variables respectively corresponding to the compressed texture images; matching the texture images with the spatio-temporal location transform variables corresponding to the texture images; generating visual textures using the texture images and the spatio-temporal location transform variables; and combining the generated visual textures corresponding to the respective texture images.

Preferably, the video processing method may further include correcting artifacts occurring at boundaries of combination of the visual textures by filtering the artifacts.

In accordance with another aspect of the present invention to accomplish the above objects, there is provided a video processing apparatus based on multiple texture images, including a seed image selection unit for dividing an input video into shot segments, and selecting one from a plurality of frames of each shot segment as a seed image; a texture point detection unit for detecting a plurality of texture points from the seed image; a variable calculation unit for tracking the plurality of texture points from the plurality of frames of the shot segment and then calculating spatio-temporal location transform variables for the respective texture points; and a texture image definition unit for defining a plurality of texture images using texture points at which the spatio-temporal location transform variables correspond to one another.

Preferably, the video processing apparatus may further include a compression unit for compressing the plurality of texture images and spatio-temporal location transform variables respectively corresponding to the texture images.

Preferably, the compression unit may compress the texture images in a video compression manner, and separately compress the spatio-temporal location transform variables in a bit stream compression manner.

Preferably, the video processing apparatus may further include an approximation unit for merging texture images, which have spatio-temporal location transform variables for which similarities calculated by obtaining correlation characteristics between texture image signals have values falling within a preset threshold value, among the plurality of texture images, into a single texture image, thus approximating the texture images.

Preferably, the texture point detection unit may detect, as the texture points, points having variations equal to or greater than a preset value in the plurality of frames.

Preferably, the video processing apparatus may further include a decompression unit for decompressing the plurality of compressed texture images and the plurality of compressed spatio-temporal location transform variables respectively corresponding to the compressed texture images; a matching unit for matching the texture images with the spatio-temporal location transform variables corresponding to the texture images; a visual texture generation unit for generating visual textures using the texture images and the spatio-temporal location transform variables; and a visual texture combination unit for combining the generated visual textures corresponding to the respective texture images.

Preferably, the video processing apparatus may further include a correction unit for correcting artifacts occurring at boundaries of combination of the visual textures by filtering the artifacts.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
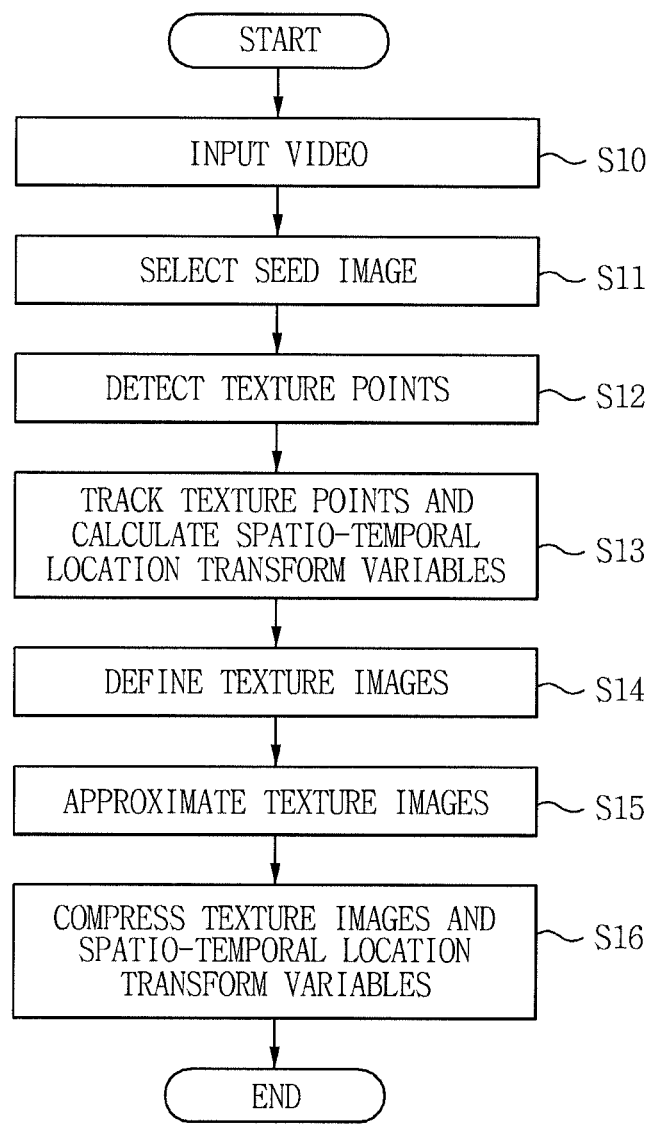
FIG. 1 is an operating flowchart showing the encoding method of a video processing method based on multiple texture images according to the present invention.

The present invention will be described in detail below with reference to the attached drawings. If in the specification, detailed descriptions of well-known functions or configurations may unnecessarily make the gist of the present invention obscure, the detailed descriptions will be omitted. The embodiments of the present invention are provided to describe the present invention more completely to those skilled in the art. Therefore, the shapes or sizes of components in the drawings may be exaggerated for the sake of providing a more definite description.

Hereinafter, the encoding method of a video processing method based on multiple texture images according to the present invention will be described.

Figure 2:
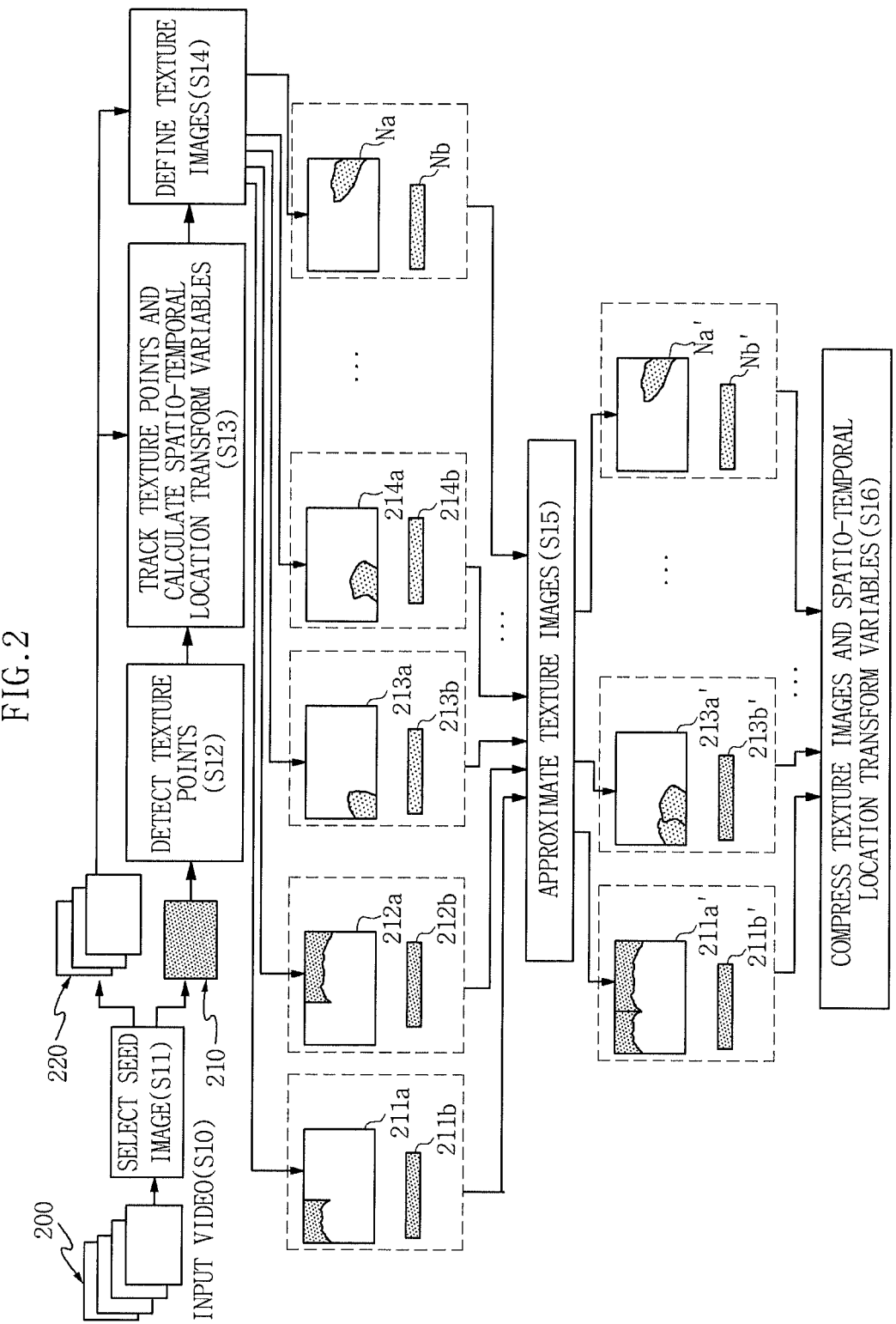
FIG. 2 is a diagram showing the encoding method of the video processing method based on multiple texture images according to the present invention.

FIG. 1 is an operating flowchart showing the encoding method of a video processing method based on multiple texture images according to the present invention. FIG. 2 is a diagram showing the encoding method of the video processing method based on multiple texture images according to the present invention.

Referring to FIGS. 1 and 2, in the encoding method of the video processing method based on multiple texture images according to the present invention, an input video 200 composed of a plurality of frames is input at step S10.

Further, the input video 200 is divided into shot segments, and one of a plurality of frames of each shot segment is selected as a seed image 210 at step S11. The remaining frames rather than the seed image 210 of the shot segment are defined as residual frame images 220. That is, when the shot segment is composed of k frames, one seed image is selected and the remaining k−1 frames are defined as the residual frame images 220. In this case, the shot segment corresponds to images continuously captured by a single camera.

A plurality of texture points are detected from the seed image 210, selected at step S11, at step S12. In this case, in the plurality of frames of each shot segment, points having variations equal to or greater than a preset value can be detected as texture points. That is, when specific points in the seed image 210 and the residual frame images 220 exhibit variations equal to or greater than the preset value, the specific points can be detected as the texture points.

Further, the plurality of texture points are tracked from the plurality of frames of the shot segment and spatio-temporal location transform variables for the respective texture points are calculated at step S13. That is, the spatio-temporal location transform variables that define variations in the texture points in the seed image 210 and the residual frame images 220 are calculated. Each of the spatio-temporal location transform variables may have the form of a function indicating a variation or the like in the position of a relevant texture point over time.

A plurality of texture images 211a, 212a, 213a, 214a, and Na are defined using texture points at which the spatio-temporal location transform variables 211b, 212b, 213b, 214b, and Nb calculated at step S13 mutually correspond to one another at step S14. In this case, a single texture image can be defined by associating texture points at which the spatio-temporal location transform variables 211b, 212b, 213b, 214b, and Nb are mutually identical to one another.

Further, in the plurality of texture images, texture images having similar spatio-temporal location transform variables are merged into a single texture image and are then approximated at step S15. In this case, similarities between the spatio-temporal location transform variables can be calculated by obtaining correlations between the texture image signals. Further, texture images for which similarities between spatio-temporal location transform variables have values falling within a preset threshold value may be merged into a single texture image. In FIG. 2, the first texture image 211a and the second texture image 212a, for which the spatio-temporal location transform variables are assumed to have higher similarity, are merged with each other, and in accordance with this merging, the first spatio-temporal location transform variable 211b and the second spatio-temporal location transform variable 212b are merged with each other. Accordingly, a first approximate texture image 211a' and a first approximate spatio-temporal location transform variable 211b' are generated. Further, the third texture image 213a and the fourth texture image 214a are merged with each other, and in accordance with this merging, the third spatio-temporal location transform variable 213b and the fourth spatio-temporal location transform variable 214b are merged with each other. Accordingly, a second approximate texture image 213a' and a second approximate spatio-temporal location transform variable 213b' are generated.

Furthermore, the plurality of texture images 211a, 212a, 213a, 214a, and Na and the plurality of spatio-temporal location transform variables 211b, 212b, 213b, 214b and Nb corresponding thereto are compressed at step S16. Further, at step S16, on the assumption that the step S15 of approximating the texture images has been performed, the plurality of approximate texture images 211a', 213a', and Na' and the plurality of approximate spatio-temporal location transform variables 211b', 213b' and Nb' corresponding to the respective approximate texture images may be compressed. Here, the texture images 211a, 212a, 213a, 214a, and Na may be compressed in a video compression manner. Further, the plurality of spatio-temporal location transform variables 211b, 212b, 213b, 214b, and Nb may be compressed in a bit stream compression manner, separately from the texture images 211a, 212a, 213a, 214a, and Na. Of course, the plurality of approximate texture images 211a', 213a', and Na' may be compressed in a video compression manner, and the plurality of approximate spatio-temporal location transform variables 211b', 213b', and Nb' may also be compressed in a bit stream compression manner, separately from the approximate texture images.

Hereinafter, the encoding method of the video processing method based on multiple texture images according to the present invention will be described with reference to the following equations.

The texture points can be detected as follows. First, for an input video $\{I(x,y,k)\}_{x=1,2,\ldots,w, y=1,2,\ldots h}$ composed of k frames, an autocorrelation matrix $E\{\vec{T}^{(j)}\vec{T}^{(j)t}\}$ is calculated, where $\vec{T}^{(j)}$ denotes the surrounding window signal of a point when $\{x, y\}$ satisfies $\{I(x^{(j)},y^{(j)},k)\}_{x^{(j)}-w'\leq x\leq x^{(j)}+w', y^{(j)}-h'\leq y\leq y^{(j)}+h'}$. Further, x and y denote pixel points in an x axis direction and a y axis direction, respectively, and $E\{\cdot\}$ is defined by a statistical expectation operator.

From eigenvalues calculated at the pixel point $\{x, y\}$ by $E\{\vec{T}^{(x,y)}\vec{T}^{(x,y)t}\}$, that is, $\lambda_1^{(x,y)}$ and $\lambda_2^{(x,y)}$, a texture point matrix $\{p(x,y,k)\}_{x=1,2,\ldots,w, y=1,2,\ldots h}$ can be obtained by the following Equation 1:

$$p(x, y, k) = \begin{cases} 1 & \text{if } \lambda_1^{(j)} > \theta_1 \text{ and } \lambda_2^{(j)} > \theta_2 \\ 0 & \text{elsewhere} \end{cases} \quad (1)$$

where $\theta_1$ and $\theta_2$ correspond to preset threshold values. In Equation 1, when the $\lambda_1^{(x,y)}$ and $\lambda_2^{(x,y)}$ at the specific pixel position are greater than $\theta_1$ and $\theta_2$, respectively, the relevant specific pixel is defined as 1. Further, when $\lambda_1^{(x,y)}$ and $\lambda_2^{(x,y)}$ at the specific pixel position are less than $\theta_1$ and $\theta_2$, respectively, the relevant specific pixel is defined as 0, and then the texture point matrix is obtained.

Further, the plurality of spatio-temporal location transform variables that define respective texture images, and the related texture images can be defined by the following Equation 2:

$$I^{(i)}(x,y,k) = w^{(i)}(x,y)I(x,y,k) \quad (2)$$

where $w^{(i)}(x,y)$ can be defined by the following Equation 3:

$$w^{(i)}(x, y) = \begin{cases} 1 & \text{if } x^{(i)} - w'/2 \leq x \leq x^{(i)} + w'/2 \text{ and } p(x, y, k) = 1 \\ 0 & \text{elsewhere} \end{cases} \quad (3)$$

Further, the input video $\{I(x,y,k)\}_{x=1,2,\ldots,w, y=1,2,\ldots h}$ composed of k frames can be defined by the sum of N texture images, as given by the following Equation 4:

$$I(x, y, k) = \sum_{i=1}^{N} I^{(i)}(x, y, k) \quad (4)$$

Furthermore, the ith segmented texture image in Equation 4 can be approximated and represented by the following Equation 5:

$$I^{(i)}(x,y,k) = T^{(i)}(x-dx_i, y-dy_i, l)) + e^{(i)}(x,y,k) \quad (5)$$

where $T^{(i)}(\cdot)$ denotes a transform function, $I^{(i)}(x,y,l)$ denotes the ith segmented texture image of the lth frame of the input video, $\{dx_i, dy_i\}$ denotes position transform vectors in x and y axis directions, and $e^{(i)}(x,y,k)$ denotes an approximate error signal estimated from $I^{(i)}(x,y,k)$. Further, in Equation 5, a frame number k falls within a range from k+1 to l+M. Equation 5 can be approximated using Taylor expansion, as given by the following Equation 6:

$$I^{(i)}(x, y, k) = T^{(i)}\left(I^{(i)}(x, y, l) - [gx_i, gy_i]\begin{bmatrix} dx_i \\ dy_i \end{bmatrix}\right) + e^{(i)}(x, y, k) \quad (6)$$

where $gx_i$ and $gy_i$ respectively denote the sums of gradient values of $I^{(i)}(x,y,k)$ in the x and y axis directions. Further, the theorem of the sum of squares of the estimated error signal can be represented by the following Equation 7:

$$\varepsilon = \sum_{x=1}^{w}\sum_{y=1}^{h} e(x, y, k)^2 \quad (7)$$

$$= \sum_{i=1}^{N} e^{(i)}(x, y, k)^2$$

$$= \sum_{i=1}^{N}\sum_{x=1}^{w}\sum_{y=1}^{h}$$

$$\left[I^{(i)}(x, y, k) - T^{(i)}\left(I^{(i)}(x, y, l) - [gx_i, gy_i]\begin{bmatrix} dx_i \\ dy_i \end{bmatrix}\right)\right]^2$$

In this case, the value of $\{dx_i, dy_i, T^{(i)}(\cdot)\}$ can be obtained by assuming the minimization of the magnitude of $\epsilon$ which is the sum of squares of the estimated error signal. That is, the value of $\{dx_i, dy_i, T^{(i)}(\cdot)\}$ is obtained by calculating the following Equations 8 and 9:

$$\left.\frac{\partial \varepsilon}{\partial \vec{d}}\right|_{T^{(i)}(\cdot)} = 0 \quad (8)$$

$$\left.\frac{\partial \varepsilon}{\partial T^{(i)}}\right|_{\vec{d}} = 0 \quad (9)$$

In this case, when $T^{(i)}(\cdot)$ is assumed to be an identity transform formula, the following Equation 10 can be obtained using the above Equations 7 and 8:

$$\frac{\partial \varepsilon}{\partial \vec{d}}\bigg|_{T^{(i)}(\cdot)} = \sum_{i=1}^{N}\sum_{x=1}^{w}\sum_{y=1}^{h}\bigg[I^{(i)}(x,y,k) - \quad (10)$$

$$\left(I^{(i)}(x,y,l) - [gx_i, gy_i]\begin{bmatrix} dx_i \\ dy_i \end{bmatrix}\right)\bigg]\begin{bmatrix} gx_i \\ gy_i \end{bmatrix} = 0$$

Further, when Equation 10 is solved, the following Equation 11 for $\{dx_i, dy_i\}$ can be obtained.

$$\begin{bmatrix} dx_i \\ dy_i \end{bmatrix} = \frac{\sum_{x=1}^{w}\sum_{y=1}^{h}[I^{(i)}(x,y,k) - I^{(i)}(x,y,l)]\begin{bmatrix} gx_i \\ gy_i \end{bmatrix}}{\sum_{x=1}^{w}\sum_{y=1}^{h}\begin{bmatrix} gx_i \\ gy_i \end{bmatrix}[gx_i \ gy_i]} \quad (11)$$

Furthermore, the transform function $T^{(i)}(\cdot)$ as given by the following Equation 12 can be obtained using $\{dx_i, dy_i\}$ obtained in Equation 11 and the above Equation 9:

$$T^{(i)} = \sum_{i=1}^{N}\sum_{x=1}^{w}\sum_{y=1}^{h}\bigg[I^{(i)}(x,y,k) - T^{(i)}\bigg(I^{(i)}(x,y,l) - [gx_i,gy_i]\begin{bmatrix} dx_i \\ dy_i \end{bmatrix}\bigg)\bigg] \quad (12)$$

$$\left(I^{(i)}(x,y,l) - [gx_i,gy_i]\begin{bmatrix} dx_i \\ dy_i \end{bmatrix}\right)$$

Equations 8 and 9 are rearranged, and then $\{I^{(i)}(x,y,l+1)\}_{x=1,2,\ldots,w,y=1,2,\ldots,h}$ can be obtained from the transform function $\{T_{l,l+1}^{(i)}\}_{i=1,2,\ldots,N}$ of $\{I^{(i)}(x,y,l)\}_{x=1,2,\ldots,w,y=1,2,\ldots,h}$. Further, $\{I^{(i)}(x,y,l+M)\}_{x=1,2,\ldots,w,y=1,2,\ldots,h}$ can be obtained from the transform function $\{T_{l,l+M}^{(i)}\}_{i=1,2,\ldots,N}$ of $\{I^{(i)}(x,y,l)\}_{x=1,2,\ldots,w,y=1,2,\ldots,h}$. Furthermore, $\{I(x,y,k)\}_{x=1,2,\ldots,w,y=1,2,\ldots,h,k=l,l+1,\ldots,l+M}$ can be represented by the seed image $\{I^{(i)}(x,y,l)\}_{x=1,2,\ldots,w,y=1,2,\ldots,h}$ and the transform function $\{T_{l,l+j}^{(i)}\}_{i=1,2,\ldots,N,j=1,2,\ldots,M}$ by using Equations 1 to 12. Furthermore, the approximation of the texture image can be achieved by calculating the similarity between $\{T_{l,l+j}^{(i)}\}_{i=1,2,\ldots,N,j=1,2,\ldots,M}$.

Such a seed image $\{I^{(i)}(x,y,l)\}_{x=1,2,\ldots,w,y=1,2,\ldots,h}$ can be compressed by a method such as in an H.264 encoder. Further, $\{T_{l,l+j}^{(i)}\}_{i=1,2,\ldots,N,j=1,2,\ldots,M}$ can be compressed by a Context Adaptive Variable Length Coder (CAVLC) or a Context Adaptive Binary Arithmetic Coder (CABAC).

Hereinafter, the decoding method of the video processing method based on multiple texture images according to the present invention will be described.

Figure 3:
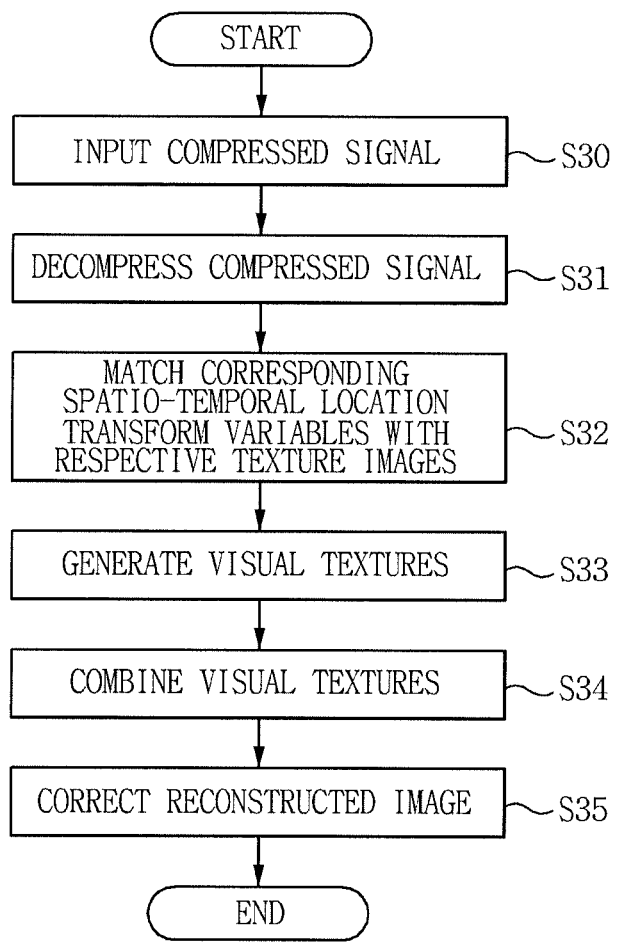
FIG. 3 is an operating flowchart showing the decoding method of the video processing method based on multiple texture images according to the present invention.
Figure 4:
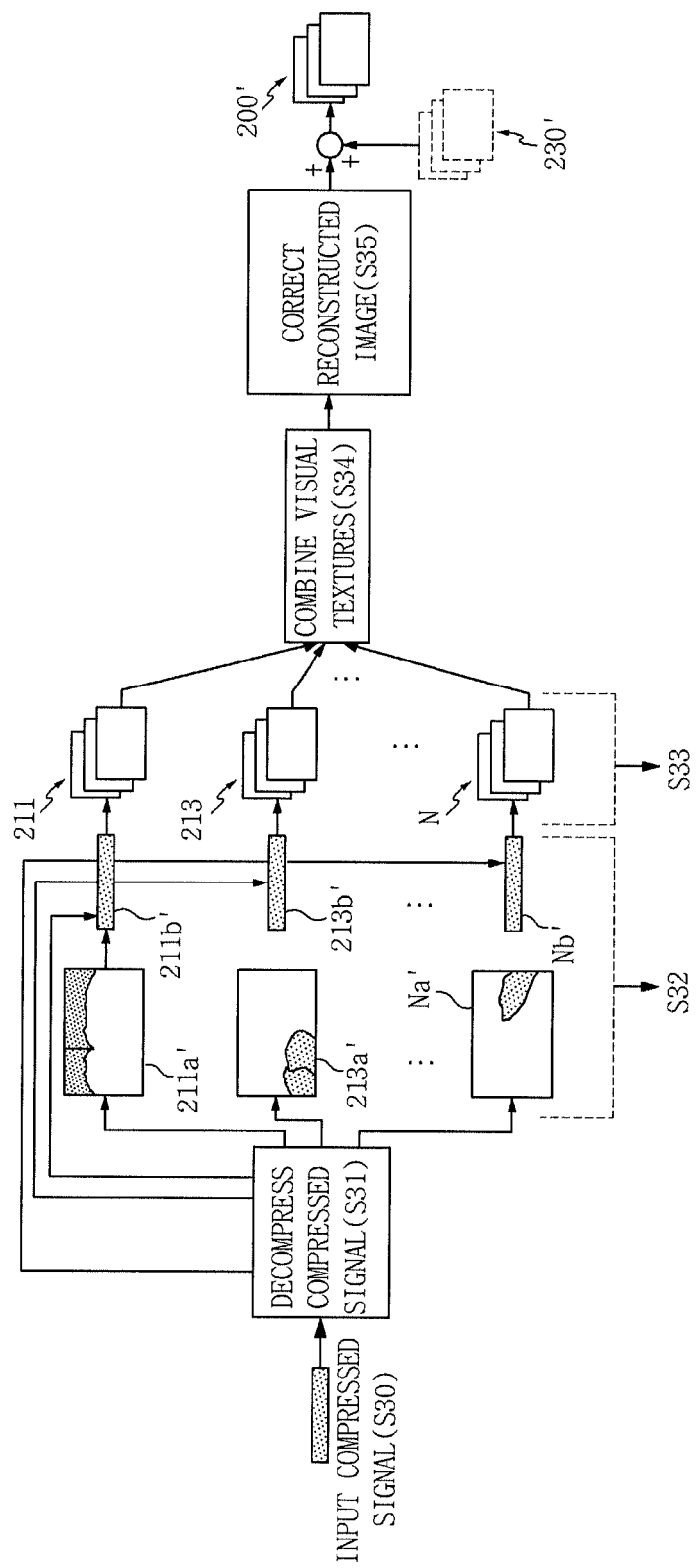
FIG. 4 is a diagram showing the decoding method of the video processing method based on multiple texture images according to the present invention.

FIG. 3 is an operating flowchart showing the decoding method of the video processing method based on multiple texture images according to the present invention. FIG. 4 is a diagram showing the decoding method of the video processing method based on multiple texture images according to the present invention.

Referring to FIGS. 3 and 4, in the decoding method of the video processing method based on multiple texture images according to the present invention, a compressed video signal is input at step S30. In this case, the compressed video signal may be a signal in which a plurality of texture images and a plurality of spatio-temporal location transform variables corresponding to the respective texture images are compressed. Of course, the compressed video signal may also be a signal in which a plurality of approximate texture images and a plurality of approximate spatio-temporal location transform variables are compressed. Further, in the compressed video signal, the plurality of texture images and the plurality of spatio-temporal location transform variables may be separately compressed.

The compressed video signal is decompressed at step S31. That is, the plurality of compressed texture images and the plurality of compressed spatio-temporal location transform variables corresponding to the respective texture images are decompressed.

In the plurality of decompressed texture images and the plurality of decompressed spatio-temporal location transform variables, each texture image and a spatio-temporal location transform variable corresponding to the texture image match each other in a one-to-one correspondence at step S32. Of course, each approximate texture image and an approximate spatio-temporal location transform variable corresponding to the approximate texture image may match each other. In FIG. 4, a first approximate texture image 211a' matches a first approximate spatio-temporal location transform variable 211b', and a second approximate texture image 213a' matches a second approximate spatio-temporal location transform variable 213b'. An Nth approximate texture image Na' matches an Nth approximate spatio-temporal location transform variable Nb'.

At step S33, visual textures are generated using the texture images and the spatio-temporal location transform variables that have matched at step S32. In detail, the spatio-temporal location transform variables defining the motions of the texture points over time are applied to the texture images, and thus visual textures, each composed of a plurality of frames, for respective texture images are generated. Of course, the visual textures can also be generated using the approximate texture images and the approximate spatio-temporal location transform variables that have matched. In FIG. 4, a first visual texture 211 composed of a plurality of frames is generated using the first approximate texture image 211a' and the first approximate spatio-temporal location transform variable 211b'. Further, a second visual texture 213 composed of a plurality of frames is generated using the second approximate texture image 213a' and the second approximate spatio-temporal location transform variable 213b'. Furthermore, an Nth visual texture N composed of a plurality of frames is generated using the Nth approximate texture image Na' and the Nth approximate spatio-temporal location transform variable Nb'.

The visual textures generated to correspond to the respective texture images at step S33 are combined at step S34. The visual textures are combined, and thus a plurality of frames of a shot segment are entirely reconstructed. In FIG. 4, the first visual texture 211, the second visual texture 213, and the Nth visual texture N are combined.

Artifacts occurring at the combination boundary of the plurality of visual textures combined at step S34 are corrected via the filtering of the artifacts at step S35. That is, the plurality of visual textures combined at step S34 are reconstructed as the simple sum thereof, so that artifacts may occur at the boundaries between the visual textures. The filtering operation for eliminating these artifacts is performed, and thus the final corrected, reconstructed image is generated.

Other shot segment-reconstructed images are combined with the shot segment-reconstructed image obtained at step S35, and then a final video 200' can be generated.

Hereinafter, the construction and operation of the video processing apparatus based on multiple texture images according to the present invention will be described.

Figure 5:
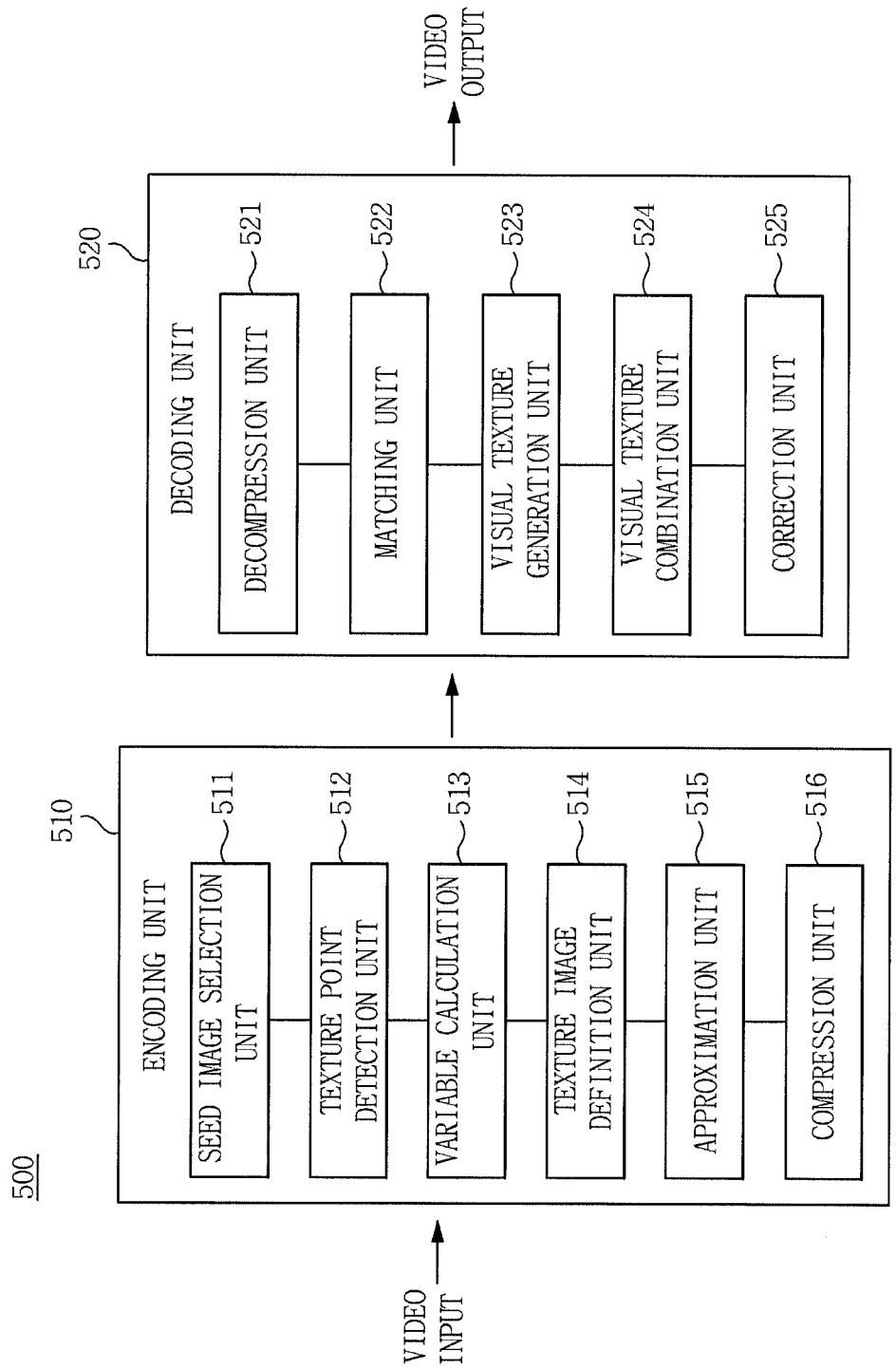
FIG. 5 is a block diagram showing a video processing apparatus based on multiple texture images according to the present invention.

FIG. 5 is a block diagram showing the construction of a video processing apparatus based on multiple texture images according to the present invention.

Referring to FIG. 5, a video processing apparatus 500 based on multiple texture images according to the present invention may be configured to include an encoding unit 510 and a decoding unit 520.

The encoding unit 510 includes a seed image selection unit 511, a texture point detection unit 512, a variable calculation unit 513, and a texture image definition unit 514. The encoding unit 510 may further include an approximation unit 515 and a compression unit 516.

The seed image selection unit 511 divides an input video into shot segments, and selects one from a plurality of frames of each shot segment as a seed image. Further, the seed image selection unit 511 defines the remaining frames rather than the seed image of the shot segment as residual frame images. That is, when the shot segment is composed of k frames, the seed image selection unit 511 selects one seed image, and defines the remaining k−1 frames as the residual frame images 220. In this case, the shot segment corresponds to images continuously captured by a single camera.

The texture point detection unit 512 detects a plurality of texture points from the seed image selected by the seed image selection unit 511. In this case, the texture point detection unit 512 may detect points, having variations equal to or greater than a preset value, as the texture points, from the plurality of frames of the shot segment. That is, when specific points in the seed image and in the residual frame images exhibit variations equal to or greater than the preset value, the texture point detection unit 512 may detect the relevant specific points as the texture points.

The variable calculation unit 513 tracks a plurality of texture points from the plurality of frames of the shot segment, and then calculates spatio-temporal location transform variables for the respective texture points. That is, the variable calculation unit 513 calculates the spatio-temporal location transform variables, which define variations in texture points in the seed image and the residual frame images. Each of the spatio-temporal location transform variables may have the form of a function indicating a variation or the like in the position of a relevant texture point over time.

The texture image definition unit 514 defines a plurality of texture images using texture points at which the spatio-temporal location transform variables calculated by the variable calculation unit 513 mutually correspond to one another. In this case, the texture image definition unit 514 may define a single texture image by associating texture points at which the spatio-temporal location transform variables are mutually identical to one another.

The approximation unit 515 approximates the texture images by merging texture images, having similar spatio-temporal location transform variables, among the plurality of texture images, into a single texture image. That is, the approximation unit 515 may generate a plurality of approximate texture images and a plurality of approximate spatio-temporal location transform variables in which the plurality of texture images and the plurality of spatio-temporal location transform variables are respectively approximated. In this case, the approximation unit 515 may calculate similarities between the spatio-temporal location transform variables by obtaining correlation characteristics between the texture image signals. Further, the approximation unit 515 may merge texture images for which the similarities between the spatio-temporal location transform variables have values falling within a preset threshold value into a single texture image.

The compression unit 516 compresses the plurality of texture images and the plurality of spatio-temporal location transform variables respectively corresponding to the texture images. Of course, the compression unit 516 may compress the plurality of approximate texture images and the plurality of approximate spatio-temporal location transform variables. Further, the compression unit 516 may compress the plurality of texture images in a video compression manner. The compression unit 516 can separately compress the plurality of spatio-temporal location transform variables in a bit stream compression manner. Of course, the compression unit 516 may compress the approximate texture images in a video compression manner and may separately compress the approximate spatio-temporal location transform variables in a bit stream compression manner.

The decoding unit 520 includes a decompression unit 521, a matching unit 522, a visual texture generation unit 523, and a visual texture combination unit 524. The decoding unit 520 may further include a correction unit 525.

The decompression unit 521 receives a compressed video signal from the encoding unit 510, and then decompresses the compressed video signal. The decompression unit 521 decompresses a plurality of compressed texture images and a plurality of compressed spatio-temporal location transform variables respectively corresponding to the texture images.

The matching unit 522 matches respective texture images and spatio-temporal location transform variables corresponding to the texture images, among the plurality of texture images and the plurality of spatio-temporal location transform variables which have been decompressed by the decompression unit 521, with one another in a one-to-one correspondence. It is apparent that the matching unit 522 may also match respective approximate texture images with approximate spatio-temporal location transform variables corresponding to the approximate texture images.

The visual texture generation unit 523 generates visual textures using the texture images and the spatio-temporal location transform variables that have matched one another. In detail, the visual texture generation unit 523 generates each visual texture composed of a plurality of frames of a relevant texture image by applying the spatio-temporal location transform variables, which define the motions or like of the texture points over time, to the texture image. Of course, the visual texture generation unit 523 may generate visual textures using the approximate texture images and the approximate spatio-temporal location transform variables that have matched one another.

The visual texture combination unit 524 combines the visual textures generated by the visual texture generation unit 523 to correspond to the respective texture images. The visual textures are combined, so that the plurality of frames of the shot segment are entirely reconstructed.

The correction unit 525 corrects artifacts occurring at the boundaries of the combination of the combined visual textures by filtering the artifacts. That is, the visual textures combined by the visual texture combination unit 524 are reconstructed as the simple sum thereof, and thus artifacts may be caused at the boundaries between the visual textures. The correction unit 525 performs a filtering operation for eliminating such artifacts, thus generating a final corrected, reconstructed image.

As described above, in the video processing method and apparatus based on multiple texture images according to the present invention, part or all of the above-described embodiments can be selectively combined and constructed so that various modifications are possible, without the construction and scheme of the above-described embodiments being limitedly applied.

According to the present invention, there is an advantage in that various video characteristics can be represented using a plurality of texture images and the spatio-temporal location transform variables of the texture images.

Further, the present invention is capable of providing a compressed video, the size of which is remarkably reduced compared to the size of the original video because the original video can be compressed and processed only using a plurality of texture images and a plurality of spatio-temporal location transform variables corresponding thereto.

Furthermore, the present invention can further reduce the size of a compressed video by approximating a number of predetermined texture images using similarities between spatio-temporal location transform variables.

Furthermore, the present invention can process videos with optimal video quality at a low transfer rate. That is, the present invention can minimize the degradation of video quality at a low transfer rate such as 1/500 bit rate.

What is claimed is:

1. A video processing method based on multiple texture images, comprising:
    dividing an input video into shot segments, and selecting one from a plurality of frames of each shot segment as a seed image;
    detecting a plurality of texture points from the seed image;
    tracking the plurality of texture points from the plurality of frames of the shot segment and then calculating spatio-temporal location transform variables for the respective texture points;
    defining a plurality of texture images using texture points at which the spatio-temporal location transform variables correspond to one another; and
    merging texture images, which have spatio-temporal location transform variables for which similarities calculated by obtaining correlation characteristics between texture image signals have values falling within a preset threshold value, among the plurality of texture images, into a single texture image, thus approximating the texture images.

2. The video processing method of claim 1, further comprising compressing the plurality of texture images and spatio-temporal location transform variables respectively corresponding to the texture images.

3. The video processing method of claim 2, wherein the compressing is configured to compress the texture images in a video compression manner, and separately compress the spatio-temporal location transform variables in a bit stream compression manner.

4. The video processing method of claim 1, wherein the detecting the plurality of texture points is configured to detect, as the texture points, points having variations equal to or greater than a preset value in the plurality of frames.

5. The video processing method of claim 2, further comprising:
    decompressing the plurality of compressed texture images and the plurality of compressed spatio-temporal location transform variables respectively corresponding to the compressed texture images;
    matching the texture images with the spatio-temporal location transform variables corresponding to the texture images;
    generating visual textures using the texture images and the spatio-temporal location transform variables; and
    combining the generated visual textures corresponding to the respective texture images.

6. The video processing method of claim 5, further comprising correcting artifacts occurring at boundaries of combination of the visual textures by filtering the artifacts.

7. A video processing apparatus based on multiple texture images, comprising:
    a seed image selection unit for dividing an input video into shot segments, and selecting one from a plurality of frames of each shot segment as a seed image;
    a texture point detection unit for detecting a plurality of texture points from the seed image;
    a variable calculation unit for tracking the plurality of texture points from the plurality of frames of the shot segment and then calculating spatio-temporal location transform variables for the respective texture points;
    a texture image definition unit for defining a plurality of texture images using texture points at which the spatio-temporal location transform variables correspond to one another; and
    an approximation unit for merging texture images, which have spatio-temporal location transform variables for which similarities calculated by obtaining correlation characteristics between texture image signals have values falling within a preset threshold value, among the plurality of texture images, into a single texture image, thus approximating the texture images.

8. The video processing apparatus of claim 7, further comprising a compression unit for compressing the plurality of texture images and spatio-temporal location transform variables respectively corresponding to the texture images.

9. The video processing apparatus of claim 8, wherein the compression unit compresses the texture images in a video compression manner, and separately compresses the spatio-temporal location transform variables in a bit stream compression manner.

10. The video processing apparatus of claim 7, wherein the texture point detection unit detects, as the texture points, points having variations equal to or greater than a preset value in the plurality of frames.

11. The video processing apparatus of claim 8, further comprising:
    a decompression unit for decompressing the plurality of compressed texture images and the plurality of compressed spatio-temporal location transform variables respectively corresponding to the compressed texture images;
    a matching unit for matching the texture images with the spatio-temporal location transform variables corresponding to the texture images;
    a visual texture generation unit for generating visual textures using the texture images and the spatio-temporal location transform variables; and
    a visual texture combination unit for combining the generated visual textures corresponding to the respective texture images.

12. The video processing apparatus of claim 11, further comprising a correction unit for correcting artifacts occurring at boundaries of combination of the visual textures by filtering the artifacts.

* * * * *